Aug. 21, 1951 E. H. WRIGHT 2,564,873
AUTOMATIC ELECTROMAGNETIC DRAIN VALVE
Filed Feb. 14, 1945
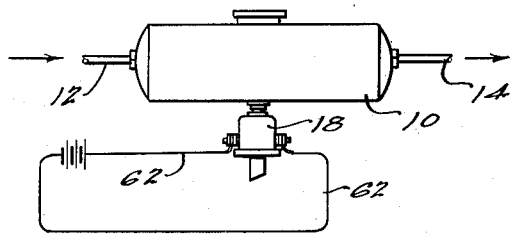
Fig. 1.
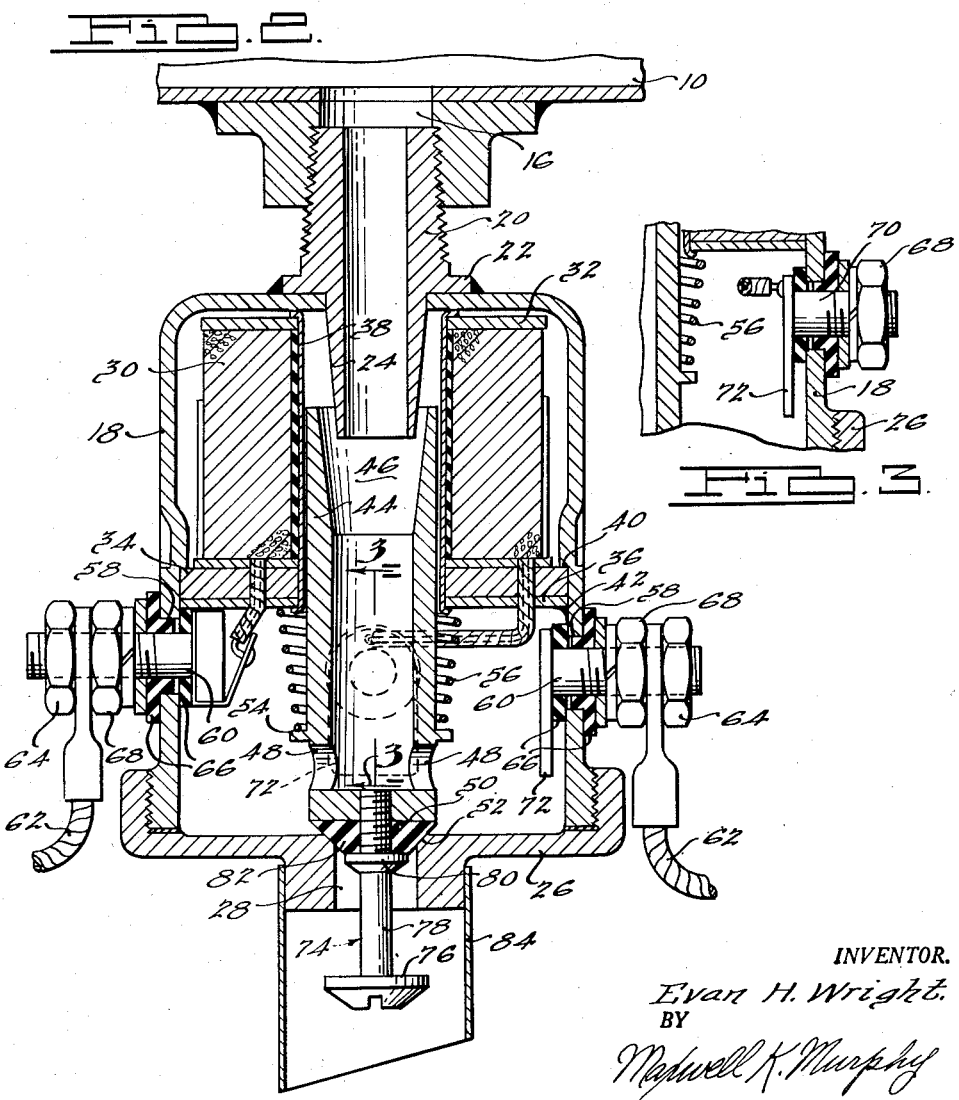
Fig. 2.
Fig. 3.
INVENTOR.
Evan H. Wright.
BY
Maxwell K. Murphy
ATTORNEY.

Patented Aug. 21, 1951

2,564,873

UNITED STATES PATENT OFFICE 2,564,873

AUTOMATIC ELECTROMAGNETIC DRAIN VALVE

Evan H. Wright, Birmingham, Mich.

Application February 14, 1945, Serial No. 577,907

2 Claims. (Cl. 137—34)

This invention relates to a drain valve and more particularly to an automatic drain valve for removing condensate from an air or a gas supply tank.

The invention is illustrated and described in connection with an air supply tank such as may be used in vehicles having compressed air for operating the brakes of a vehicle, but it is desired to point out that my invention is useful in connection with other types of tanks and for other purposes whether or not the tank contains air or a gas and whether or not the pressure is held above atmospheric pressure.

An object of the invention is to provide a receptacle for collecting condensate formed in the tank and to automatically drain the condensate from the receptacle.

Another object of the invention is to provide electrically controlled means for removing the condensate after a pre-determined amount of condensate has been collected in a receptacle external of the tank.

A further object of the invention is to provide spaced electrodes within the collection receptacle which are shorted by condensate within the receptacle to complete an electrical circuit and to provide electrodes of such size and electrical carrying capacity as to permit carrying of sufficient electricity to melt any ice that may form in the receptacle to interfere with the successful and efficient operation of the device.

Another object of the invention is to provide an electrically operated valve in the discharge passage of the receptacle for controlling a flow of fluid through the passage, and to provide means on the valve to assist the closing of the valve after it has been opened.

Other objects and advantages of the invention will more fully appear from the following description taken in connection with the accompanying drawings in which:

Fig. 1 is a view in side elevation illustrating an embodiment of my invention as applied to a tank, an electrical circuit being diagrammatically illustrated in connection therewith;

Fig. 2 is an enlarged sectional view showing an electrical terminal; and

Fig. 3 is a fragmentary sectional view taken on line 3—3 of Fig. 2.

Referring to the drawings, the improved device has been illustrated as applied to a tank 10 adapted to contain a supply of air or gas to be used for diversified purposes. The tank 10 is shown provided with an inlet opening 12 and an outlet opening 14. The drain valve is screw-threaded into an opening 16 in the lower portion of the tank 10.

The device selected for illustrating the invention comprises an inverted cup shaped housing 18 having an opening in its end wall for receiving a tubular fitting 20 which is externally screw-threaded to be received in the internally threaded opening 16. The fitting 20 is provided with a flange 22 which is secured to the end wall of the housing 18 such as by welding. The fitting is also provided with an inwardly projecting tubular portion 24.

The open end of the housing 18 is externally threaded to receive an internally threaded cover 26. The cover 26 is provided with an outlet opening 28 through which condensate within the housing is discharged.

A magnetic solenoid winding 30 is positioned in the housing 18 adjacent the closed end thereof and surrounds the inwardly projecting tubular portion 24. The solenoid 30 is provided at its opposite ends with insulation members 32 and 34 and a lower plate 36 at one end thereof forms a bottom wall for the solenoid. The winding, insulating members 32 and 34 and plate 36 are secured together as a unit by a sleeve member 38 extending through a central opening in the parts. The opposite ends of the sleeve member 38 are flanged over the outer faces of the insulating member 32 and the disc 36. A flange 40 is formed on the inner periphery of the housing 18 against which the insulating member 34 abuts. The disc 36 may be welded to the inner periphery of the housing 18 as indicated at 42.

A reciprocating metallic valve 44 is mounted in the solenoid 30. The valve 44 has an axial extending passage 46 terminating in radial extending openings 48.

The lower end of the valve 44 is closed and provided with a valve face 50 which normally engages a valve seat 52 around the opening 28 in the cover 26. The valve 44 is the core of the solenoid and has its upper end projecting beyond the lower end of the tubular projection 24 and is reciprocable between the outer periphery of the tubular member 24 and the inner periphery of the sleeve 28.

Adjacent the lower end of the valve 44 is a radial extending flange 54. A compression coil spring 56 is positioned between the lower surface of the disc 36 and the flange 54 to normally hold the valve 50 on its seat 52.

Any moisture which collects in the tank 10 flows through the opening 16, tubular fitting 20, passage 46 in the valve 44 and radially extending openings 48, into the lower portion of the housing 18. The condensate is retained in the lower portion of the housing so long as the valve 50 closes the opening 28.

It will be understood that when the solenoid 30 is electrically energized, the valve 44, serving as a core for the solenoid, will be moved upwardly withdrawing the valve 50 from its seat 52 to thereby permit a discharge of the condensate within the housing through the opening 28.

Circumferentially extending openings 58 are formed in the side wall of the housing 18 to receive electrical terminals from a source of electrical energy. Electrodes 60 are received in the openings 58 to which the electrical connections 62 are attached such as by means of screw-threaded nuts 64. Terminals 60 are provided with inner and outer insulating washers 66 and nuts 68, screw-threaded on the electrodes 60, hold the electrodes in position on the housing. The electrode at the left side of the drawing is connected to one end of the solenoid winding and the opposite end of the solenoid winding is connected to a terminal 70, illustrated in Fig. 3. The terminal 70 and the electrode 60 at the right of the drawing are circumferentially spaced and each are provided with contact members 72 which are spaced from the bottom of the housing 18. These terminals are, in effect, a switch to be short circuited by the condensate within the bottom portion of the housing.

When the condensate within the housing reaches a height to contact the members 72, the electrical energy supplied through the electrical connections 62 is then conducted through the solenoid 30 which lifts the core valve 44 to permit the condensate to be discharged through the opening 28. The contact members 72 are of such size and capable of carrying sufficient electrical capacity to heat the condensate sufficiently to melt any ice that may be formed in the receptacle which might interfere with the successful and efficient operation of the device.

It is to be understood that the device may be connected to a closed circuit such that the device will automatically operate intermittently when the condensate has reached a level to short the terminals 72. As soon as the condensate has been removed from the receptacle, the electrical circuit is broken and the spring 56 urges the core valve 44 downwardly to close the valve 50. The device is then ready for another operation.

As a means for assisting closing of the valve 44, to prevent its remaining open too long and thereby exhaust air from the tank, there is provided a pull back cap 74 having a headed portion 76 and a stem 78 which is screw-threaded into the lower end of the valve 44. A shoulder 80 is provided to receive a valve facing member 82 removably secured to the lower end of the valve 44. As the fluid is discharged through the opening 28, it impinges against the face of the headed portion 76 forcing the valve on its seat. A guard 84 has been provided to protect the pull back cap 74.

This device is very useful for eliminating condensate from air lines which impairs the successful operation of devices dependent upon clean air or gas contained within supply tank.

It will be understood that various changes including the size, shape and arrangement of parts may be made without departing from the spirit of my invention and it is not my intention to limit its scope other than by the terms of the appended claims.

I claim:

1. A drain valve comprising a fluid receptacle having a tubular inlet passage projecting into said receptacle, said receptacle having a discharge passage axially aligned with said inlet passage, a metallic valve within said receptacle constructed and arranged to engage the discharge passage so as to close off flow therethrough, a compression spring urging said valve toward said discharge passage to effect a seating of the valve on the discharge passage, a tubular stem on said valve having radially extending passages for the discharge of fluid therethrough, said tubular stem having a portion telescoping the projecting portion of said tubular inlet passage, a magnetic solenoid within said receptacle and surrounding the tubular stem on said valve, and spaced electrical contact members within said receptacle connected to said solenoid to be short circuited by the fluid within said receptacle for energizing said solenoid.

2. A drain valve comprising a housing having a cylindrical side wall portion, an open end portion, and an end wall portion, a tubular inlet fitting in said end wall portion having an externally extending portion and an internally projecting portion, a partition between the end wall and the open end of said housing, a solenoid within said housing between the end wall of said housing and said partition and surrounding the internally projecting portion of said fitting, a tubular valve member axially movable in said solenoid and having an upper portion and a lower portion, said upper portion being located between said solenoid and the internally projecting portion of said fitting, said tubular valve member rendered perforate by radially extending passages in said lower portion, a cap for the open end of said housing having a discharge opening therethrough and a valve seat surrounding the opening, said tubular valve constructed and arranged to engage said valve seat, a compression spring between said valve member and said partition for urging said valve into seating relation with said seat, and spaced contact members carried by said housing in the space between said cap and said partition connected to said solenoid for energizing said solenoid, when short circuited by fluid in said housing.

EVAN H. WRIGHT.

REFERENCES CITED

The following references are of record in the file of this patent:

UNITED STATES PATENTS

| Number | Name | Date |
| --- | --- | --- |
| 257,069 | Reznor | Apr. 25, 1882 |
| 407,656 | Hawkins | July 23, 1889 |
| 691,569 | Pohlman | Jan. 21, 1902 |
| 1,105,397 | Bowers | July 28, 1914 |
| 1,531,007 | Jackson | Mar. 24, 1925 |
| 1,538,092 | Cohen | May 19, 1925 |
| 1,651,865 | Blake | Dec. 6, 1927 |
| 1,722,160 | Smith | July 23, 1929 |
| 2,279,243 | Parsons | Apr. 7, 1942 |
| 2,330,290 | King | Sept. 28, 1943 |
| 2,413,655 | Russel | Dec. 31, 1946 |

FOREIGN PATENTS

| Number | Country | Date |
| --- | --- | --- |
| 677,819 | Germany | June 8, 1939 |